US012596555B1

(12) United States Patent
Kulchytskyy et al.

(10) Patent No.: US 12,596,555 B1
(45) Date of Patent: *Apr. 7, 2026

(54) PROVIDING SYSTEM INVENTORY DATA FROM A FIRMWARE TO A BASEBOARD MANAGEMENT CONTROLLER USING AN IDENTIFIER

(71) Applicant: AMERICAN MEGATRENDS INTERNATIONAL, LLC, Duluth, GA (US)

(72) Inventors: Igor Kulchytskyy, Lawrenceville (GA); Manikandan Palaniappan, Tamil Nadu (IN); Manickavasakam Karpagavinayagam, Johns Creek, GA (US); Devadath Vijay K, Chennai (IN); Ginu George, Chennai (IN); Shirley Heby Hubert, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/789,479

(22) Filed: Jul. 30, 2024

Related U.S. Application Data

(63) Continuation of application No. 18/171,150, filed on Feb. 17, 2023, now Pat. No. 12,086,607.

(51) Int. Cl.
| | |
|---|---|
| *G06F 9/44* | (2018.01) |
| *G06F 8/65* | (2018.01) |
| *G06F 9/4401* | (2018.01) |

(52) U.S. Cl.
CPC .............. *G06F 9/4406* (2013.01); *G06F 8/65* (2013.01); *G06F 9/4411* (2013.01)

(58) Field of Classification Search
CPC ......... G06F 9/4406; G06F 8/65; G06F 9/4411
See application file for complete search history.

(56) References Cited

U.S. PATENT DOCUMENTS

| | | | |
|---|---|---|---|
| 10,572,366 B1 * | 2/2020 | Raju ................... | G06F 11/3065 |
| 10,776,286 B1 * | 9/2020 | Kulchytskyy ............ | G06F 8/65 |
| 2018/0336042 A1 * | 11/2018 | Rathineswaran ..... | G06F 9/4406 |

* cited by examiner

*Primary Examiner* — Stefan Stoynov
(74) *Attorney, Agent, or Firm* — Newport IP, LLC; Ryan Donoghue

(57) ABSTRACT

A firmware driver generates a REST Hypertext Transfer Protocol ("HTTP") request to an identifier for combined inventory data to an interface exposed by a baseboard management controller ("BMC"). The firmware driver receives the combined inventory data from the BMC in response to the request to the identifier exposed by the BMC. The firmware driver performs an inventory of the managed computing system to obtain updated inventory data and determines if the updated inventory data and the combined inventory data are identical. If the updated inventory data and the combined inventory data are not identical, the firmware driver generates new combined inventory data for the managed computing system and posts (e.g., by way of a call to an HTTP POST method) the new combined inventory data for the managed computing system to the identifier exposed by the BMC.

20 Claims, 8 Drawing Sheets

PROVIDE SYSTEM INVENTORY DATA TO
BMC USING OEM-DEFINED URI

PROVIDE SYSTEM INVENTORY DATA TO
BMC USING OEM-DEFINED URI

PROVIDE SYSTEM INVENTORY DATA TO
BMC USING OEM-DEFINED URI

PROVIDE SYSTEM INVENTORY DATA TO
BMC USING OEM-DEFINED URI

PROVIDING SYSTEM INVENTORY DATA FROM A FIRMWARE TO A BASEBOARD MANAGEMENT CONTROLLER USING AN IDENTIFIER

CROS-REFERENCE TO RELATED APPLICATION

This application is a continuation of U.S. patent application Ser. No. 18/171,150, filed Feb. 17, 2023, the content of which application is hereby expressly incorporated herein by reference in its entirety.

BACKGROUND

Managed computing systems commonly include a baseboard management controller ("BMC") in order to enable platform management. In addition to other types of management functionality, BMCs commonly provide functionality for exposing data describing the inventory of a managed computing system to a management client over an out-of-band ("OOB") network connection.

In order to provide the functionality described above, a firmware executing on the managed computing system typically performs an inventory of the managed computing system and generates data describing the inventory. The firmware then provides the inventory data to the BMC which, in turn, exposes the inventory data to a management client over an OOB network connection. A system administrator using the management client may view and utilize the inventory data in various ways.

Previous mechanisms for providing inventory data from a firmware to a BMC send separate inventory data for each resource in the managed computing system to the BMC. Because the inventory data for each resource is sent separately using such a mechanism, this process can be very slow. Consequently, this can increase boot time significantly, particularly when a managed computing system has many resources. This also increases the utilization of computing resources by a managed computing system during boot.

It is with respect to these and other considerations that the disclosure made herein is presented.

SUMMARY

Technologies are described herein for providing system inventory data from a firmware to a BMC using an identifier. Through implementations of the disclosed technologies, inventory data describing the components of a managed computing system can be provided from a firmware to a BMC in a manner that does not require sending inventory data for each resource in the managed computing system separately. This can speed up the boot process and reduce the utilization of computing resources at boot time by a managed computing system implementing the disclosed technologies. Technical benefits other than those specifically mentioned herein can also be realized through an implementation of the disclosed technologies.

In order to provide the functionality described herein, a firmware driver is executed by a firmware of a managed computing system in one embodiment. During boot time of the managed computing system, the firmware driver generates a request to a BMC for combined inventory data for the managed computing system. For example, the firmware driver may generate a REST Hypertext Transfer Protocol ("HTTP") request (e.g., a call to the HTTP GET method) to an identifier for the combined inventory data to an interface exposed by a management server in the BMC. The firmware driver receives the combined inventory data for the managed computing system from the BMC in response to the request to the identifier exposed by the BMC.

As discussed briefly above, a BMC is a specialized service processor that monitors the physical state of a computer, network server, or other managed hardware device using sensors, and exposes information to a remote management client through an OOB network connection. BMCs can also provide functionality for exposing data describing the inventory of a managed computing system to a management client via an OOB connection using the technologies disclosed herein.

In an embodiment, the REST HTTP request for the combined inventory data is made to an identifier that is compatible with the REDFISH management standard. REDFISH is a successor to previous manageability interfaces created by the Distributed Management Task Force ("DMTF"). REDFISH is an open industry standard specification and schema for simple, modern, and secure management of scalable platform hardware, such as server computers located in data centers.

The REDFISH specification and schema specifies a REST interface, and utilizes JAVASCRIPT object notation ("JSON") and the Open Data Protocol ("OData") to integrate management solutions within existing toolchains. Although the embodiments disclosed herein are described primarily as utilizing an identifier that is compatible with the REDFISH management standard, the REST HTTP requests disclosed herein can be made to identifiers that are defined according to other specifications in other embodiments.

The combined inventory data requested by the firmware driver from the BMC includes data describing the installed components of the managed computing system. For example, the combined inventory data may identify the installed components of the managed computing system including, but not limited to, a memory of the managed computing system, memory domains of the managed computing system, processors of the managed computing system, storage resources of the managed computing system, network adapters of the managed computing system, input/output ("I/O") controllers of the managed computing system, graphics controllers of the managed computing system, bus slots of the managed computing system, devices present in bus slots of the managed computing system, and media controllers of the managed computing system.

In an embodiment, the firmware driver also performs an inventory of the managed computing system to obtain updated inventory data for the managed computing system. Once the firmware driver has performed the inventory of the managed computing system, the firmware driver determines if the updated inventory data and the combined inventory data are identical. In this manner, the firmware driver can determine if any modifications to the inventory of the managed computing system were made since the last time the firmware driver retrieved the combined inventory data from the BMC.

In an embodiment, the combined inventory data and the updated inventory data are organized into groups. In this embodiment, the firmware driver can determine if the updated inventory data and the combined inventory data are identical by determining if each group of the combined inventory data is identical to a corresponding group in the updated inventory data. Each group of the combined inventory data that is not identical to a corresponding group in the updated inventory data indicates that one or more modifications were made to installed components of the managed computing system.

If the firmware driver determines that the updated inventory data and the combined inventory data are identical, the firmware driver causes control to be passed from the firmware to an operating system executing on the managed computing system. However, if the firmware driver determines that the updated inventory data and the combined inventory data are not identical, the firmware driver generates new combined inventory data for the managed computing system. The new combined inventory data includes new or changed inventory data for groups of the combined inventory data that are not identical to corresponding groups of the updated inventory data.

Once the firmware driver has generated the new inventory data, the firmware driver can post (e.g., by way of a call to an HTTP POST method) the new combined inventory data for the managed computing system to the identifier exposed by the BMC. Following posting of the new combined inventory data for the managed computing system to the identifier exposed by the BMC, the firmware driver can instruct the BMC to begin processing of the new combined inventory data. Thereafter, the firmware driver can cause control to be passed from the firmware to an operating system executing on the managed computing system.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

Figure 2A:
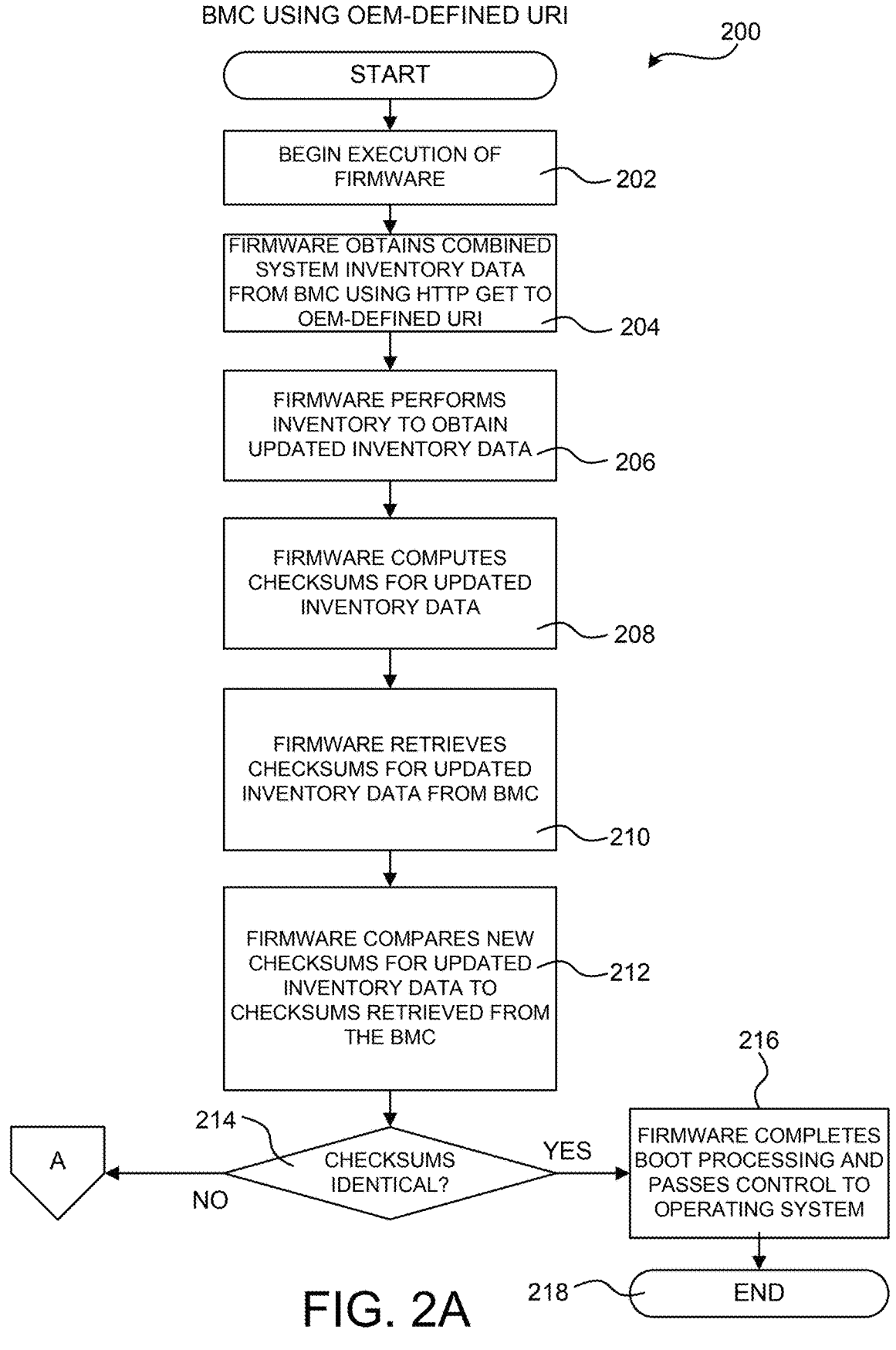
FIG. 2A is a flow diagram showing a routine that illustrates additional aspects of mechanism shown in FIGS.
Figure 2B:
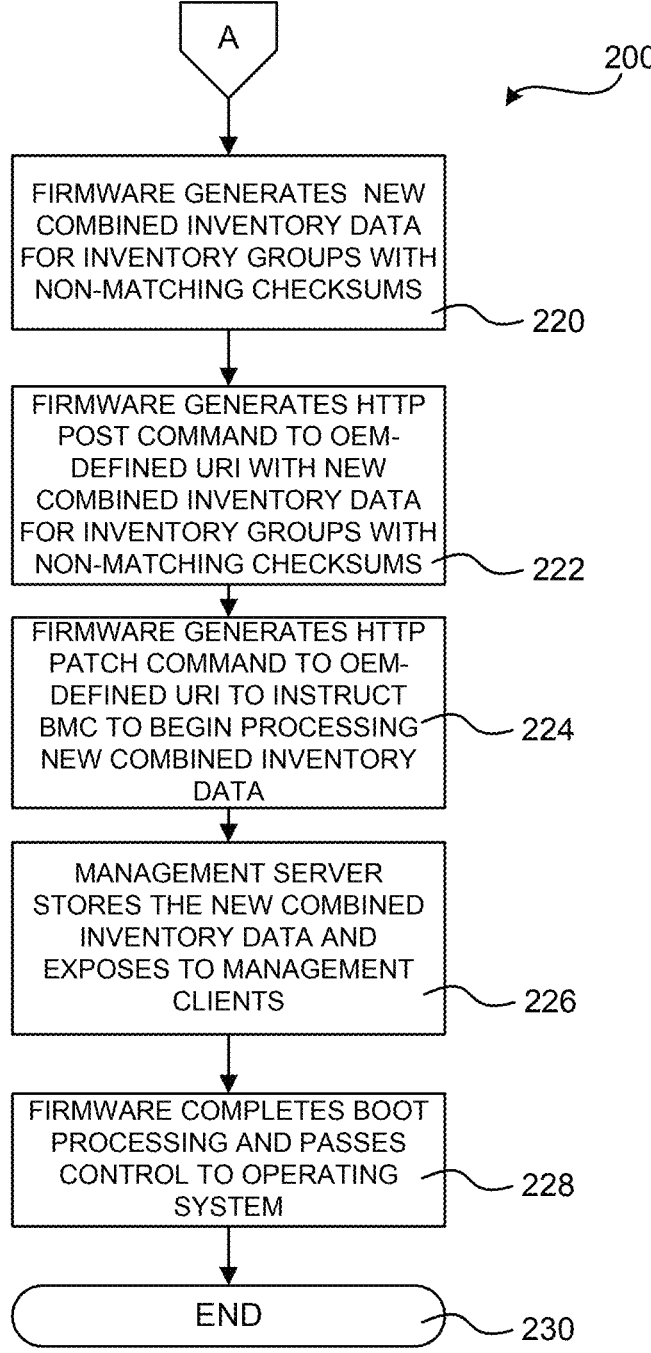
Figure 3:
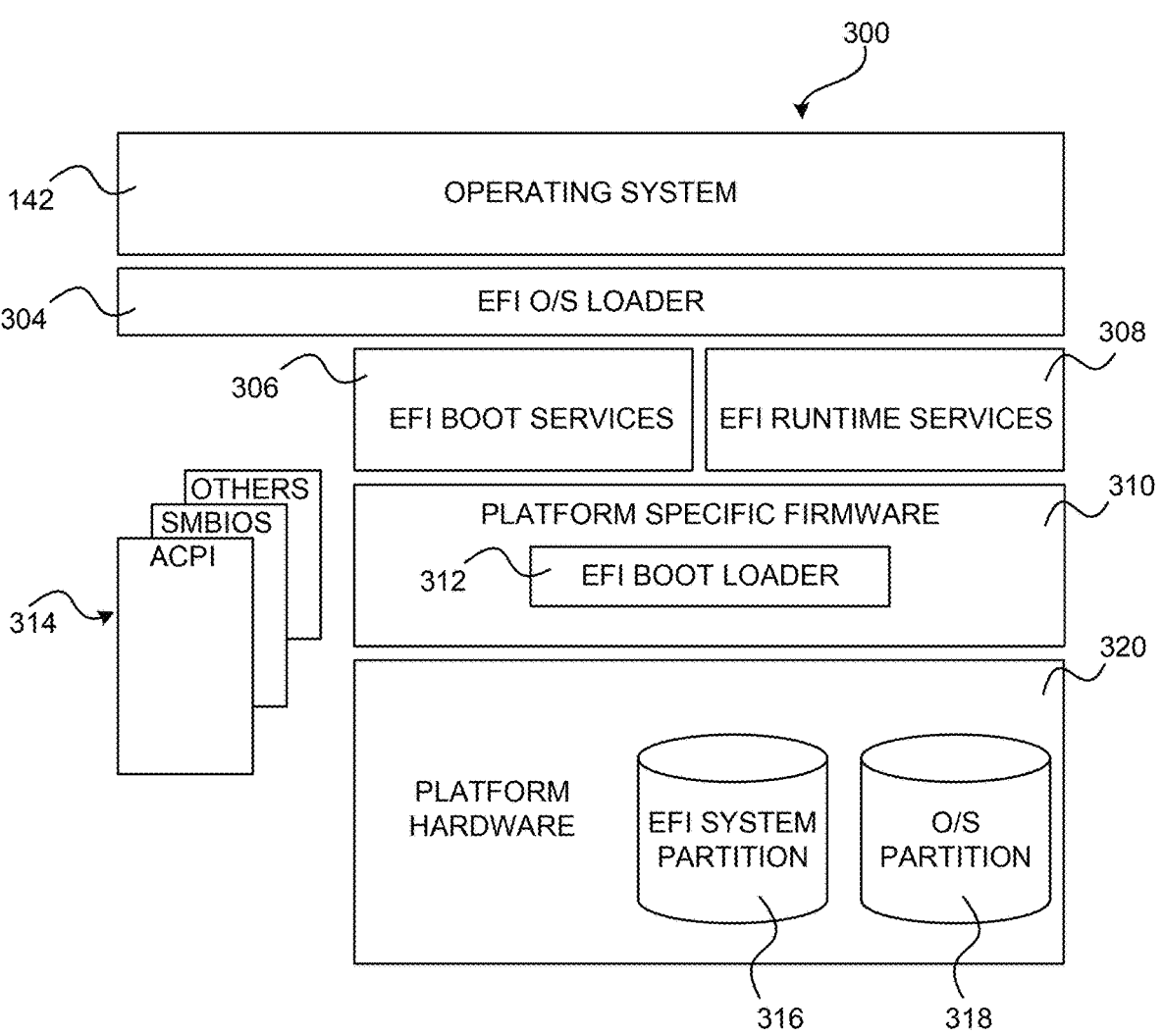
Figure 4:
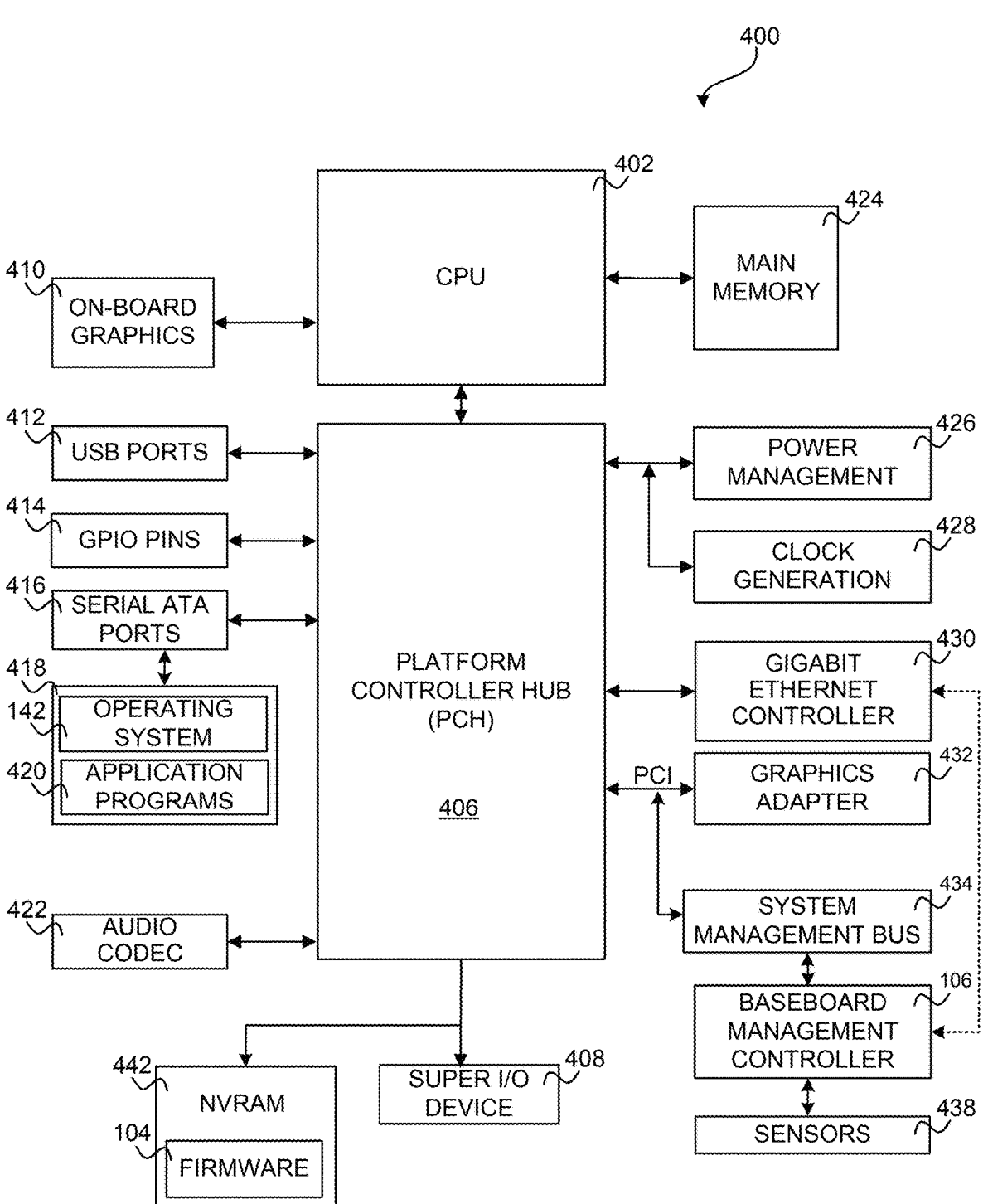

1A-1D for providing system inventory data from a firmware to a BMC using an OEM-defined URI, according to one embodiment disclosed herein;

FIG. 2B is a flow diagram showing additional aspects of the routine shown in FIG. 2A for providing system inventory data from a firmware to a BMC using an OEM-defined URI, according to one embodiment disclosed herein;

FIG. 3 is a software architecture diagram illustrating a software architecture for a unified extensible firmware interface ("UEFI")-compliant firmware that provides an operating environment for aspects of the technologies presented herein in one embodiment; and FIG. 4 is a computer architecture diagram that shows an illustrative architecture for a computer that can implement the technologies disclosed herein.

DETAILED DESCRIPTION

The following detailed description is directed to technologies for providing system inventory data from a firmware to a BMC using an original equipment manufacturer ("OEM")-defined uniform resource identifier ("URI"). As discussed briefly above, implementations of the disclosed technologies enable inventory data for a managed computing system to be provided from a firmware to a BMC in a manner that does not require sending inventory data describing each resource in the managed computing system separately. This can speed up the boot process and reduce the utilization of computing resources by a managed computing system implementing the disclosed technologies. Technical benefits other than those specifically mentioned herein can also be realized through an implementation of the disclosed technologies. Additional details regarding these aspects will be provided below with regard to FIGS. 1A-4.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, hand-held computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIGS. 1A-1D are software architecture diagrams illustrating aspects of a mechanism disclosed herein for providing system inventory data from a firmware to a BMC using an OEM-defined URI, according to an embodiment. The embodiments disclosed herein are presented in the context of a managed computing system 102 that is equipped with a BMC 106. As discussed briefly above, a BMC 106 is a specialized service processor that monitors the physical state of a computer, such as the managed computing system 102, using sensors and communicates with a system administrator through an OOB network (not shown in the FIGS.) connected to a management client 110. BMCs can also provide functionality for exposing data describing the inventory of a managed computing system 102 to a management client 110 via an OOB connection using the technologies disclosed herein.

In order to provide various aspects of its functionality, some of which are described herein, the BMC 106 also communicates with a firmware 104 of the managed computing system 102. The firmware 104 can be implemented to be compliant with the Unified Extensible Firm Interface ("UEFI") Specification. Other types of firmware can be utilized in other embodiments. Additional details regarding the configuration and operation of the firmware 104 in one embodiment are provided below with regard to FIG. 3.

In order to provide the functionality disclosed herein, the firmware 104 executes a firmware driver 118, in one embodiment. The firmware driver 118 is a software component that generates a request to the BMC 106 for combined inventory data 124 for the managed computing system 102. As will be described in greater detail below, the combined inventory data 124 is generated by the firmware driver 118 and stored at the BMC 106. Additionally, and as will also be described in greater detail below, the firmware driver 118 also generates checksums for the combined inventory data 124, which are also stored at the BMC 106.

The combined inventory data 124 includes data describing the installed components of the managed computing system 102. For example, the combined inventory data 124 may identify the installed components of the managed computing system 102 including, but not limited to, a memory of the managed computing system 102, memory domains of the managed computing system 102, processors of the managed computing system 102, storage resources of the managed computing system 102, network adapters of the managed computing system 102, I/O controllers of the managed computing system 102, graphics controllers of the managed computing system 102, bus slots of the managed computing system 102, devices present in bus slots of the managed computing system 102, and media controllers of the managed computing system 102. The combined inventory data 124 identifies other installed components of the managed computing system 102 in other embodiments.

Figure 1A:
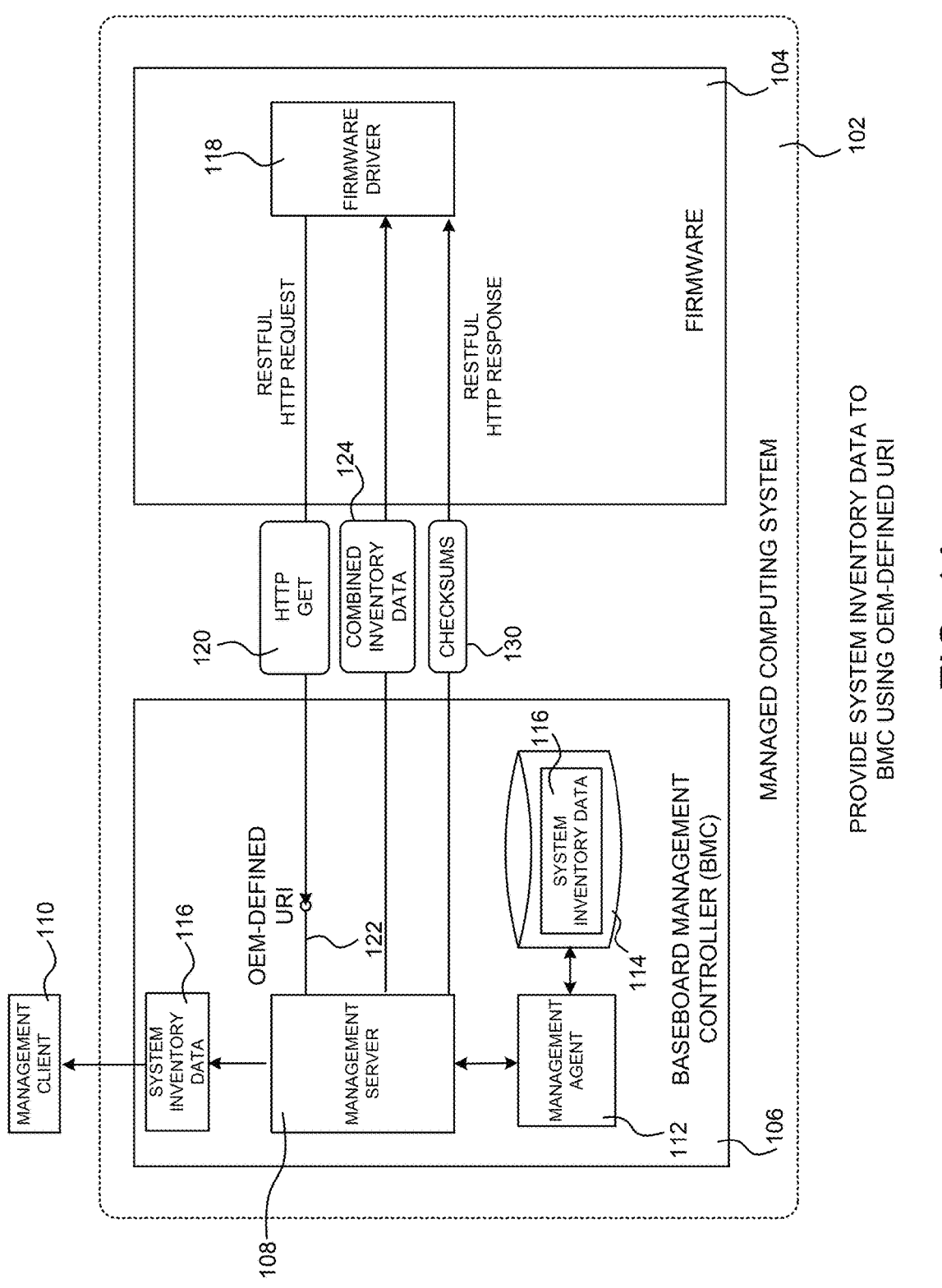
FIG. 1A is a software architecture diagram illustrating aspects of a mechanism disclosed herein for providing system inventory data from a firmware to a BMC using an original equipment manufacturer ("OEM")-defined uniform resource identifier ("URI"), according to one embodiment.

As shown in FIG. 1A, a management agent 112 executing in the BMC 116 stores system inventory data 116 in an appropriate data store 114. When a request for combined inventory data 124 is received, such as that described above, the management agent 112 may retrieve the combined inventory data 124 from the data store 114. The management server 108, in turn, can provide the combined inventory data 124 in response to the request received from the firmware driver 118. For instance, the management server 108 provides a REST HTTP response to the firmware driver 118 that includes the combined inventory data 124, in an embodiment. The management server 108 can also receive and respond to requests for the system inventory data 116 from the management client 110 in a similar fashion. The firmware driver 118 can also obtain checksums for the combined inventory data 124 from the BMC 106 in a similar fashion.

In an embodiment, the firmware driver 118 generates a REST HTTP request (e.g., a call 120 to the HTTP GET method) for the combined inventory data 124 to an OEM-defined URI 122 exposed by a management server 108 in the BMC 106. The firmware driver 118 also obtains checksums 130 for the combined inventory data 124 from the OEM-defined URI 122 exposed by the management server 108 in the BMC 106, in an embodiment. The checksums 130 are included in the combined inventory data 124, in an embodiment.

The OEM-defined URI 122 is a URI that has been defined by the OEM of the managed computing system 102. The OEM-defined URI 122 is compatible with the REDFISH management standard, in an embodiment. As discussed briefly above, REDFISH is a successor to previous manageability interfaces created by the DMTF. REDFISH is an open industry standard specification and schema for simple, modern, and secure management of scalable platform hardware, such as server computers located in data centers.

The REDFISH specification and schema specifies a REST interface, and utilizes JSON and OData to integrate management solutions within existing toolchains. Although the embodiments disclosed herein are described primarily as utilizing an OEM-defined URI 122 that is compatible with the REDFISH management standard, the requests described herein can be made to OEM-defined URIs that are defined according to other specifications in other embodiments.

In an embodiment, the BMC 106 determines whether changes were made to the system inventory data 116 prior to the current reboot, such as by a user of the management client 110. If no changes to the system inventory data 116 were made, the BMC 106 does not transmit the combined inventory data 124 to the firmware driver 118. Rather, the BMC 106 transmits the checksums 130 for the previously stored combined inventory data 124 in response to the call to the HTTP GET method received from the firmware driver 118.

Figure 1B:
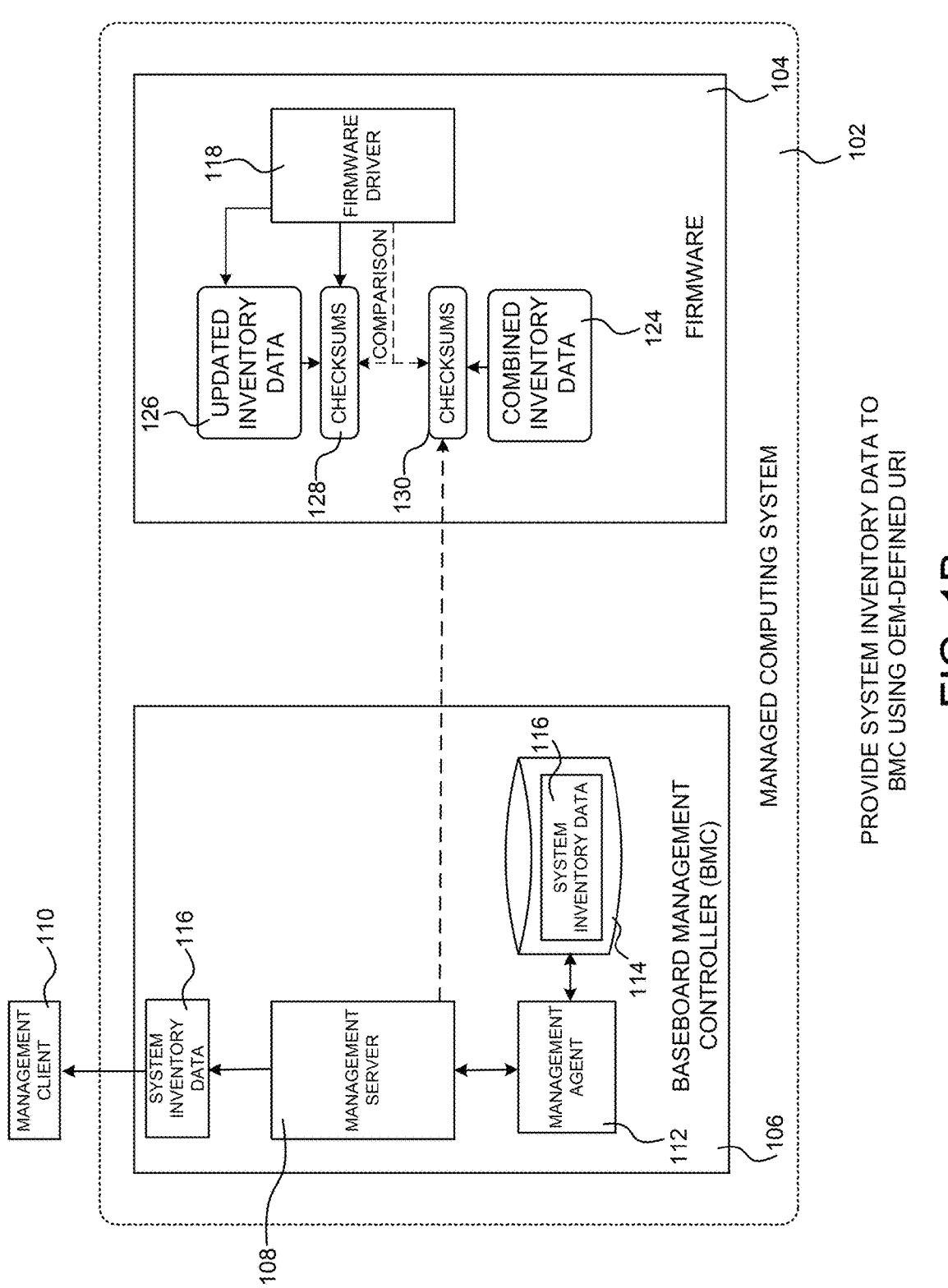
FIG. 1B is a software architecture diagram illustrating additional aspects of the mechanism shown in FIG. 1A for providing system inventory data from a firmware to a BMC using an OEM-defined URI, according to an embodiment disclosed herein.

As shown in FIG. 1B, the firmware driver 118, or another component of the firmware 104, also performs an inventory of the managed computing system 102 to obtain updated inventory data 126 for the managed computing system 102. The firmware driver 118, or another component of the firmware 104, also generates checksums 128 for the updated inventory data 126, in an embodiment.

Once the firmware driver 118 has performed the inventory of the managed computing system 102, the firmware driver 118 determines if the updated inventory data 126 and the combined inventory data 124 are identical. In this manner, the firmware driver 118 can determine if any modifications to the inventory of the managed computing system 102 were made since the last time the combined inventory data 124 was retrieved from the BMC 106.

In an embodiment, the combined inventory data 124 and the updated inventory data 126 are organized into groups. In this embodiment, the firmware driver 118 can determine if the updated inventory data 126 and the combined inventory data 124 are identical by determining if each group of the combined inventory data 124 is identical to a corresponding group in the updated inventory data 126.

For instance, and as discussed briefly above, in an embodiment, the firmware driver 118 generates checksums 128 (e.g., CRC32 checksums) for groups in the updated inventory data 126. In this embodiment, the firmware driver 118 obtains checksums 130 for the combined inventory data 130 from the BMC 106 in the manner described above with respect to FIG. 1A. The firmware driver 118 then compares the checksums 128 that it calculated to the checksums 130 received from the BMC 106 to identify those groups in the updated inventory data 126 that are different than the corresponding groups in the combined inventory data 124.

Table 1, set forth below, shows the structure of the combined inventory data 124 in an embodiment. In this example, the combined inventory data 124 has been organized into various groups, including groups corresponding to memory, memory domains, processors, storage, etc. In this embodiment, checksums 130 might be generated for some or all of these groups and compared to checksums 128 for corresponding groups in the updated inventory data 126 to identify those groups in the updated inventory data 126 that are different than the corresponding groups in the combined inventory data 124.

TABLE 1

```
//Structure of post_inventory.json//
{
    Systems :
        Memory : [ ]
            MemoryMetrics [ ]
            Assembly
        MemoryDomains : [ ]
            MemoryChunks [ ]
        Processors : [ ]
            SubProcessors [ ]
            ProcessorMetrics
            AccelerationFunctions [ ]
            OperationConfigs [ ]
            Assembly
        Storage : [ ]
            Drives [ ]
            Volumes [ ]
            StorageControllers [ ]
            Redundancy
        Boot :
            BootOptions [ ]
            BootOrder [ ]
        EthernetInterfaces : [ ]
            VLANS [ ]
        USBControllers : [ ]
            Ports [ ]
        GraphicsControllers : [ ]
            Ports [ ]
        NetworkInterfaces [ ]
        SimpleStorage [ ]
        Bios
        Pools [ ]
        Namespaces [ ]
        ...other properties..
    Chassis :
        NetworkAdapters: [ ]
            Ports [ ]
            NetworkDeviceFunctions : [ ]
                VLANS [ ]
        PCIeDevices : [ ]
            PCIeFunctions [ ]
            MediaControllers [ ]
            PCIeSlots [ ]
        Assembly :
        ...other properties..
        BiosAttributeRegistry : [ ]
        GroupCrcList
        BiosRtp Version
        BiosRedfish Version
}
```

If the firmware driver determines that the updated inventory data 126 and the combined inventory data 124 are identical, the firmware driver 118 causes control to be passed from the firmware 104 to an operating system executing on the managed computing system 102. However, if the firmware driver 118 determines that the updated inventory data 126 and the combined inventory data 124 are not identical, the firmware driver 118 generates new combined inventory data 132 for the managed computing system 102. The new combined inventory data 132 includes new or changed inventory data for groups of the combined inventory data 124 that are not identical to corresponding groups of the updated inventory data 126. In an embodiment, the firmware driver 118 also generates checksums for the new combined inventory data 132.

Figure 1C:
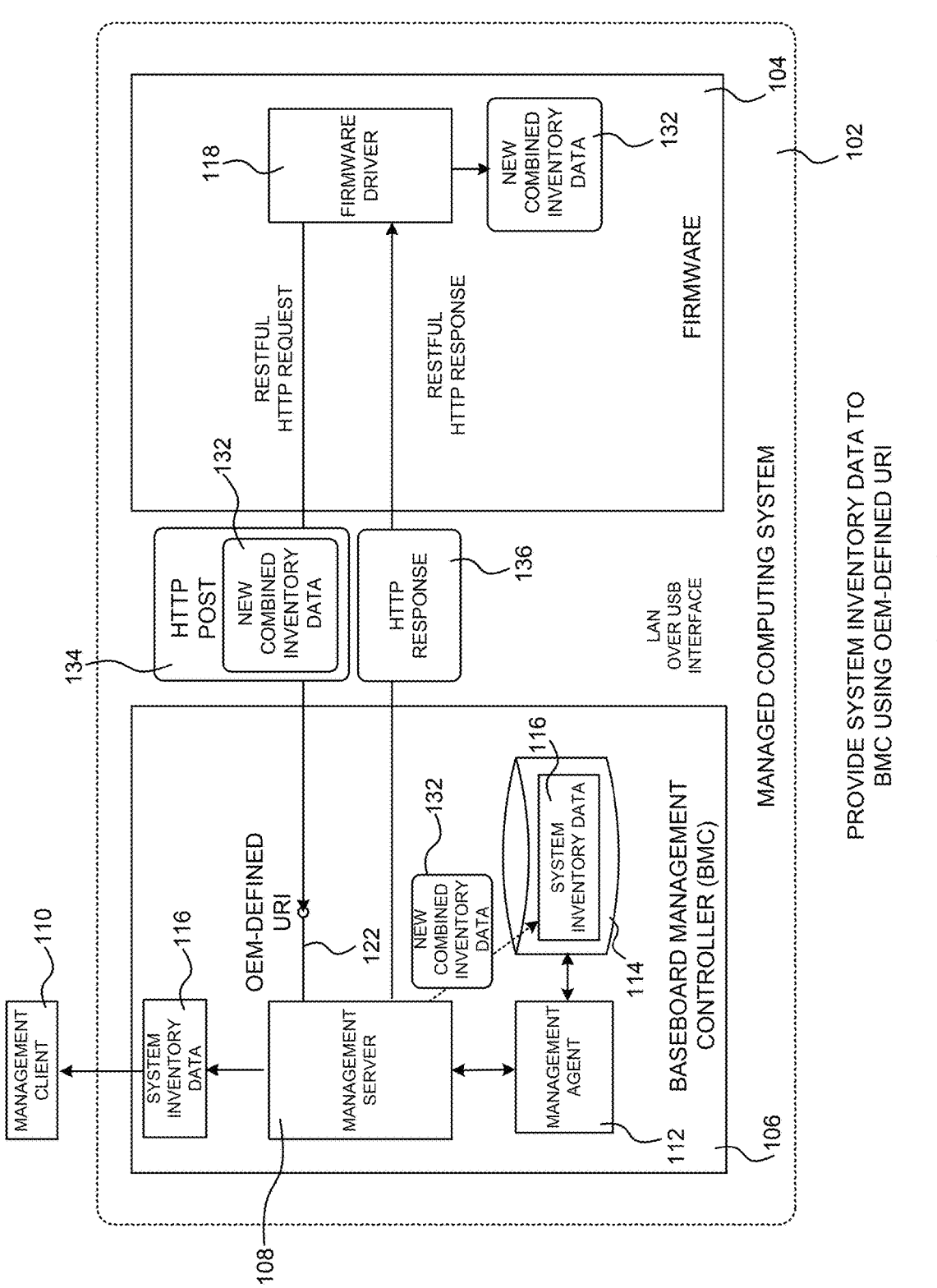
FIG. 1C is a software architecture diagram illustrating additional aspects of the mechanism shown in FIGS. 1A-1D for providing system inventory data from a firmware to a BMC using an OEM-defined URI, according to an embodiment disclosed herein.
Figure 1D:
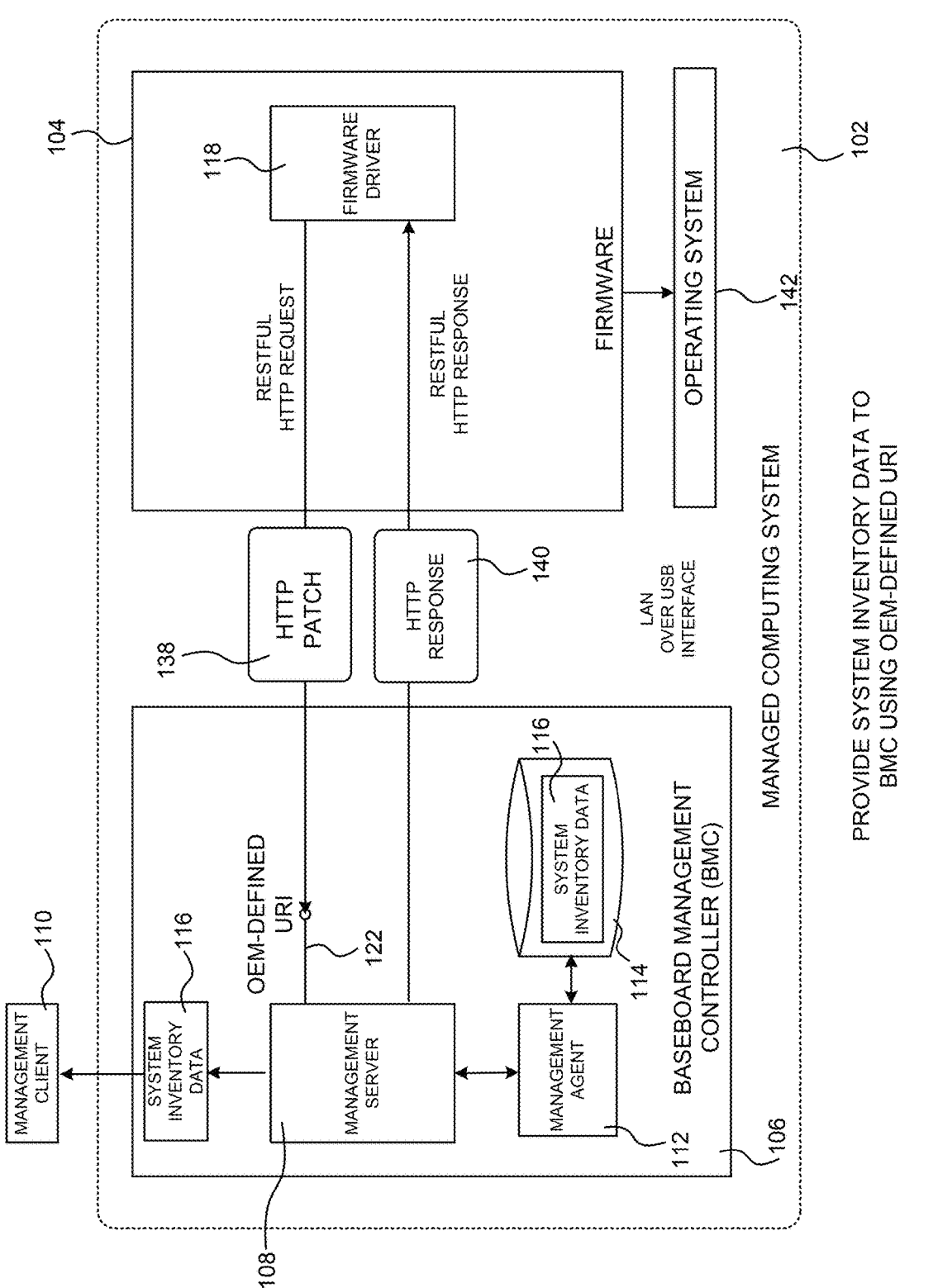
FIG. 1D is a software architecture diagram illustrating additional aspects of the mechanism shown in FIGS. 1A-1C for providing system inventory data from a firmware to a BMC using an OEM-defined URI, according to an embodiment disclosed herein.

As shown in FIG. 1C, once the firmware driver 118 has generated the new inventory data 132, the firmware driver 118 can post (e.g., by way of a call 134 to an HTTP POST method) the new combined inventory data 132 for the managed computing system 102 to the OEM-defined URI 122 exposed by the BMC 106. In response thereto, the management server 108 generates a REST HTTP response 136 to the call 134 such as, for example, a response 136 including data indicating that processing of the REST HTTP POST request was successful. The response 136 is compatible with the REDFISH management standard in embodiments disclosed herein. In an embodiment, the firmware driver 118 also posts the checksums for the new combined inventory data 132 to the to the OEM-defined URI 122 exposed by the BMC 106 in a similar fashion. As discussed above, the firmware driver 118 retrieves the checksums when it retrieves the corresponding combined inventory data 124, in an embodiment.

Following posting of the new combined inventory data 132 for the managed computing system 102 to the OEM-defined URI 122 exposed by the BMC 106, the firmware driver 118 can instruct the BMC 106 to begin processing of the new combined inventory data 132. For instance, in the embodiment shown in FIG. 1D, the firmware driver 118 has made an HTTP PATCH call 138 to the OEM-defined URI 122 to instruct the BMC 106 to begin processing of the new combined inventory data 132. In response thereto, the management agent 112 can store the new combined inventory data 132 and any associated checksums in the data store 114. Additionally, the management server 108 generates a REST HTTP response 140 to the call 138 such as, for example, a response 140 including data indicating that the call 138 was received successfully. The response 136 is compatible with the REDFISH management standard in embodiments disclosed herein. Thereafter, the firmware driver 118 can cause control to be passed from the firmware 104 to an operating system executing on the managed computing system 102.

In an embodiment, the firmware 104 also provides functionality for generating updated checksums for system inventory data 116 stored in the data store 114 that is changed. For instance, a user of the management client 110 might make changes to security certificates or other types of system inventory data 116 for the managed computing system. In this scenario, the management server 108 can notify the firmware driver 118 of the change. In response thereto, the firmware driver 118 can generate new checksums and provide the new checksums to the BMC 106 for storage and utilization in the manner described above. In an embodiment, the firmware driver 118 sets the value of the new checksums 128 to zero. In this embodiment, the firmware driver 118 computes new checksums 130 for the combined inventory data 124 when it receives checksums from the BMC 106 having a value of zero. The firmware driver 118 computes new checksums 130 for the combined inventory data 124 prior to performing the comparison between the checksums 128 and 130.

It is to be appreciated that FIGS. 1A-1D and the other FIGS. have been simplified for discussion purposes, and that many other software and hardware components can be utilized to implement the functionality disclosed herein. For example, and without limitation, various networks and networking components can be utilized to connect the management client 110 to the BMC 106. In this regard, it is also to be appreciated that while only a single managed computing system 102 and a single management client 110 have been illustrated in FIGS. 1A-1D, many such computing systems can be utilized in various configurations.

FIGS. 2A and 2B are flow diagrams showing a routine that illustrates additional aspects of mechanism shown in FIGS. 1A-ID for providing combined inventory data 124 from a firmware 104 to a BMC 106 using an OEM-defined URI 122, according to an embodiment disclosed herein. It is to be appreciated that the logical operations described herein with respect to FIGS. 2A and 2B, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 200 begins at operation 202, where the firmware 104 begins execution. The routine 200 then proceeds to operation 204, where the firmware driver 118 generates a REST HTTP request (e.g., a call 120 to the HTTP GET method) to the OEM-defined URI 122 exposed by the management server 108 in the BMC 106 to obtain the combined inventory data 124. This process is illustrated in FIG. 1A and described above. The firmware driver 118 can obtain the combined inventory data 124 at a boot time of the computing system 102. As used herein, the term "boot time" refers to the time period after the firmware 104 begins executing and before the operating system of the managed computing system 102 starts to load.

From operation 204, the routine 200 proceeds to operation 206, where the firmware driver 118, or another component of the firmware 104, performs an inventory of the managed computing system 102 to obtain updated inventory data 126 for the managed computing system 102. Once the inventory of the managed computing system 102 has been taken, the routine 200 proceeds to operation 208, where the firmware driver 118 computes checksums 128 (e.g., CRC32 checksums) for groups in the updated inventory data 126, in an embodiment. At operation 210, the firmware driver 118 retrieves the previously-stored checksums 130 for the combined inventory data 124 provided by the BMC 106 using the OEM-defined URI 122, in an embodiment.

From operation 210, the routine 200 proceeds to operation 212, where the firmware driver 118 compares the checksums 128 and 130 to determine if the updated inventory data 126 and the combined inventory data 124 are identical. If the checksums 128 and 130 are identical, the routine 200 proceeds from operation 214 to operation 216, where the firmware 104 passes control of the managed computing system 102 to an operating system. The routine 200 then proceeds from operation 216 to operation 218, where it ends.

If, at operation 214, the firmware driver 118 determines that the checksums 128 and 130 are not identical, the routine 200 proceeds from operation 214 to operation 220. At operation 220, the firmware driver 118 generates new combined inventory data 132 for groups having non-matching checksums. In this way, new combined inventory data 132 is generated only for items of inventory in the managed computing system 102 that have changed. The firmware driver 118 also generates checksums for the new combined inventory data 132 in the manner described above. The routine 200 then proceeds from operation 220 to operation 222.

At operation 222, the firmware driver 118 posts (e.g., by way of a call 134 to an HTTP POST method) the new combined inventory data 132 for the managed computing system 102 generated at operation 220 to the OEM-defined URI 122 exposed by the BMC 106. The firmware driver 118 also posts the checksums for the new combined inventory data 132 to the OEM-defined URI 122 exposed by the BMC 106, in an embodiment. In response thereto, the management server 108 generates a REST HTTP response 136 to the call 134 such as, for example, a response 136 including data indicating that processing of the REST HTTP POST request was successful.

From operation 222, the routine 200 proceeds to operation 224, where the firmware driver 118 instructs the BMC 106 to begin processing of the new combined inventory data 132. For instance, in the embodiment shown in FIG. 1D, the firmware driver 118 has made an HTTP PATCH call 138 to the OEM-defined URI 122 to instruct the BMC 106 to begin processing of the new combined inventory data 132. In response thereto, the management agent 112 stores the new combined inventory data 132 in the data store 114 at operation 226. The management agent 112 can also store the checksums for the new combined inventory data 132 in the data store 114 in a similar fashion. Additionally, the management server 108 generates a REST HTTP response 140 to the call 138 such as, for example, a response 140 including data indicating that the call 138 was received successfully.

From operation 226, the routine 200 proceeds to operation 228, where the firmware 104 completes its boot processing and passes control to an operating system executing on the managed computing system 102. The routine 200 then proceeds from operation 228 to operation 230, where it ends.

Turning now to FIG. 3, a software architecture diagram will be described that illustrates an architecture for a Unified Extensible Firmware Interface ("UEFI") Specification-compliant firmware 300 that can be configured to provide and/or utilize aspects of the technologies disclosed herein. In particular, the firmware architecture shown in FIG. 3 can be utilized to implement the firmware 104 described above. The firmware 104 can also be implemented in other ways in other configurations.

The UEFI Specification describes an interface between an OS 142 and a UEFI Specification-compliant firmware 300. The UEFI Specification also defines an interface that a firmware 300 can implement, and an interface that an OS 142 can use while booting. How a firmware implements the interface can be left up to the manufacturer of the firmware. The UEFI Specification also defines a way for an OS 142 and a firmware 300 to exchange information necessary to support the operating system boot process. The term "UEFI Specification" used herein refers to both the EFI Specification developed by INTEL CORPORATION and the UEFI Specification managed by the UEFI FORUM.

As shown in FIG. 3, the architecture can include platform hardware 320, such as that described below with regard to FIG. 4 and an OS 142. A boot loader 312 for the OS 142 can be retrieved from the UEFI system partition 316 using a UEFI operating system loader 304. The UEFI system partition 316 can be an architecturally shareable system partition. As such, the UEFI system partition 316 can define a partition and file system designed to support safe sharing of mass storage between multiple vendors. An OS partition 318 can also be utilized.

Once started, the UEFI OS loader 304 can continue to boot the complete OS 142. In doing so, the UEFI OS loader 304 can use UEFI boot services 306, an interface to other supported specifications to survey, comprehend, and initialize the various platform components and the operating system software that manages them. Thus, interfaces 314 from other specifications can also be present on the system. For example, the Advanced Configuration and Power Interface ("ACPI") and System Management BIOS ("SMBIOS") specifications can be supported.

UEFI boot services 306 can provide interfaces for devices and system functionality used during boot time. UEFI runtime services 308 can also be available to the UEFI OS loader 304 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the OS 142 and system firmware 300, the Framework is a group of specifications that together describe a firmware implementation that has been designed to perform the full range of operations that are required to initialize a platform from power on through transfer of control to the OS 142. The specifications that make up the Framework, which are also available from INTEL CORPORATION, are also expressly incorporated herein by reference.

Referring now to FIG. 4, a computer architecture diagram that shows an illustrative architecture for a computer that can provide an operating environment for the technologies presented herein will be described. For example, and without limitation, the computer architecture shown in FIG. 4 can be utilized to implement the managed computing system 102 and/or any of the other computing systems disclosed herein.

FIG. 4 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 4 shows an illustrative computer architecture for a computer 400 that can be utilized in the implementations described herein. The illustrative computer architecture shown in FIG. 4 includes a baseboard, or "motherboard", which is a printed circuit board to which a multitude of components or devices can be connected by way of a system bus or other electrical communication path. In one illustrative configuration, a central processing unit ("CPU") 402 operates in conjunction with a Platform Controller Hub ("PCH") 406. The CPU 402 is a central processor that performs arithmetic and logical operations necessary for the operation of the computer 400. The computer 400 can include a multitude of CPUs 402. Each CPU 402 might include multiple processing cores.

The CPU 402 provides an interface to a random access memory ("RAM") used as the main memory 424 in the computer 400 and, possibly, to an on-board graphics adapter 410. The PCH 406 provides an interface between the CPU 402 and the remainder of the computer 400.

The PCH 406 can also be responsible for controlling many of the input/output functions of the computer 400. In particular, the PCH 406 can provide one or more universal serial bus ("USB") ports 412, an audio codec 422, a gigabit Ethernet controller 430, and one or more general purpose input/output ("GPIO") pins 414. The USB ports 412 can include USB 2.0 ports, USB 3.0 ports and USB 3.1 ports among other USB ports. The audio codec 422 can include Intel High Definition Audio, Audio Codec '97 ("AC'97") and Dolby TrueHD among others.

The PCH 406 can also include functionality for providing networking functionality through a gigabit Ethernet controller 430 or another type of network controller. The gigabit Ethernet controller 430 is capable of connecting the computer 400 to another computer via a network. Connections which can be made by the gigabit Ethernet controller 430 can include LAN or WAN connections. LAN and WAN networking environments are commonplace in offices, enterprise-wide computer networks, intranets, and the Internet.

The PCH 406 can also provide a bus for interfacing peripheral card devices such as a graphics adapter 432. In one configuration, the bus may be a Peripheral Component Interconnect ("PCI") bus, a Peripheral Component Interconnect extended ("PCI-X") bus, a Peripheral Component Interconnect Express ("PCIe") bus, or another type of suitable bus for interconnecting the various components shown in FIG. 4.

The PCH 406 can also provide a system management bus 434 for use in managing the various components of the computer 400. Additional details regarding the operation of the system management bus 434 and its connected components are provided below. Power management circuitry 426 and clock generation circuitry 428 can also be utilized during the operation of the PCH 406.

The PCH 406 is also configured to provide one or more interfaces for connecting mass storage devices to the computer 400. For instance, according to one configuration, the PCH 406 includes a serial advanced technology attachment ("SATA") adapter for providing one or more serial ATA ports 416. The serial ATA ports 416 can be connected to one or more mass storage devices storing an OS, such as OS 142 and application programs 420, such as a SATA disk drive 418. As known to those skilled in the art, an OS 142 comprises a set of programs that control operations of a computer and allocation of resources. An application program is software that runs on top of the OS 142, or other runtime environment, and uses computer resources to perform application specific tasks desired by the user.

According to one configuration, the OS 142 comprises the LINUX operating system. According to another configuration, the OS 142 comprises the WINDOWS operating system from MICROSOFT CORPORATION. According to another configuration, the OS 142 comprises the UNIX operating system or one of its variants. It should be appreciated that other operating systems can also be utilized.

The mass storage devices connected to the PCH 406, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 400.

A low pin count ("LPC") interface can also be provided by the PCH 406 for connecting a Super I/O device 408. The Super I/O device 408 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 442 for storing firmware 104 that includes program code containing the basic routines that help to start up the computer 400 and to transfer information between elements within the computer 400 as discussed above with regard to FIG. 3.

It should be appreciated that the program modules disclosed herein, including the firmware 104, can include software instructions that, when loaded into the CPU 402 and executed, transform a general-purpose computer 400 into a special-purpose computer 400 customized to facilitate all, or part of, the operations disclosed herein. As detailed throughout this description, the program modules can provide various tools or techniques by which the computer 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules. These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the gigabit Ethernet controller 430), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 424 and/or NVRAM 442. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 406 can include a system management bus 434. As discussed above, when utilized to implement the managed computing system 102, the system management bus 434 can include a BMC 106. As discussed above, the BMC 106 is a microcontroller that monitors operation of the computer 400. In a more specific configuration, the BMC 106 monitors health-related aspects associated with the computer 400, such as, but not limited to, the temperature of one or more components of the computer 400, speed of rotational components (e.g., spindle motor, CPU fan, etc.) within the computer 400, the voltage across or applied to one or more components within the computer 400, and the available and/or used capacity of memory devices within the computer 400. To accomplish these monitoring functions, the BMC 106 is communicatively connected to one or more components by way of the system management bus 434 in some configurations.

In one configuration, these components include sensor devices 438 for measuring various operating and performance-related parameters within the computer 400. The sensor devices 438 can be either hardware or software based components configured or programmed to measure or detect one or more of the various operating and performance-related parameters.

The BMC 106 functions as the master on the system management bus 434 in some implementations, but can also function as a slave in other implementations. Each of the various components communicatively connected to the BMC 106 by way of the system management bus 434 is addressed using a slave address. The system management bus 434 is used by the BMC 106 to request and/or receive various operating, performance-related, and inventory parameters from one or more components, such as the firmware 104, which are also communicatively connected to the system management bus 434.

It should be appreciated that the functionality provided by the computer 400 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 400 might not include all the components shown in FIG. 4, can include other components that are not explicitly shown in FIG. 4, or might utilize an architecture completely different than that shown in FIG. 4.

Based on the foregoing, it should be appreciated that technologies for providing system inventory data from a firmware 104 to a BMC 106 using an OEM-defined URI 122 have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:

generating a request for combined inventory data for a managed computing system, the request generated by a firmware of the managed computing system to an identifier exposed by a baseboard management controller (BMC);

receiving the combined inventory data for the managed computing system at the firmware of the managed computing system in response to the request;

performing an inventory of the managed computing system to obtain updated inventory data for the managed computing system;

determining if the updated inventory data and the combined inventory data are identical;

responsive to determining that the updated inventory data and the combined inventory data are not identical, generating new combined inventory data for the managed computing system; and posting the new combined inventory data for the managed computing system to the identifier exposed by the BMC.

2. The computer-implemented method of claim 1, further comprising passing control from the firmware to an operating system responsive to determining that the updated inventory data and the combined inventory data are identical.

3. The computer-implemented method of claim 1, further comprising following posting the new combined inventory data for the managed computing system to the identifier exposed by the BMC:

instructing the BMC to begin processing of the new combined inventory data; and passing control from the firmware to an operating system.

4. The computer-implemented method of claim 1, wherein the combined inventory data is organized into groups, the updated inventory data is organized into groups, and wherein determining if the updated inventory data and the combined inventory data are identical comprises determining if groups of the combined inventory data are identical to corresponding groups of the updated inventory data.

5. The computer-implemented method of claim 4, wherein generating new combined inventory data for the managed computing system comprises generating new combined inventory data for groups of the combined inventory data that are not identical to corresponding groups of the updated inventory data.

6. The computer-implemented method of claim 1, wherein the combined inventory data and the new combined inventory data comprise inventory data for a plurality of components of the managed computing system.

7. The computer-implemented method of claim 1, wherein the identifier exposed by the BMC is compatible with the REDFISH management standard.

8. A computer-readable storage medium having computer-executable instructions stored thereupon which, when executed by a computing system, cause the computing system to:

generate a request for combined inventory data for a managed computing system, the request generated by a firmware of the managed computing system to an identifier exposed by a baseboard management controller (BMC);

receive the combined inventory data for the managed computing system at the firmware of the managed computing system in response to the request;

perform an inventory of the managed computing system to obtain updated inventory data for the managed computing system;

determine if the updated inventory data and the combined inventory data are identical;

responsive to determining that the updated inventory data and the combined inventory data are not identical, generate new combined inventory data for the managed computing system; and post the new combined inventory data for the managed computing system to the identifier exposed by the BMC.

9. The computer-readable storage medium of claim 8, having further computer-executable instructions stored thereupon which, when executed by the computing system, cause the computing system to pass control from the firmware to an operating system responsive to determining that the updated inventory data and the combined inventory data are identical.

10. The computer-readable storage medium of claim 8, having further computer-executable instructions stored thereupon which, when executed by the computing system, cause the computing system to:

following posting the new combined inventory data for the managed computing system to the identifier exposed by the BMC, instruct the BMC to begin processing of the new combined inventory data; and pass control from the firmware to an operating system.

11. The computer-readable storage medium of claim 8, wherein the combined inventory data is organized into groups, the updated inventory data is organized into groups, and wherein determining if the updated inventory data and the combined inventory data are identical comprises determining if groups of the combined inventory data are identical to corresponding groups of the updated inventory data.

12. The computer-readable storage medium of claim 11, wherein generating new combined inventory data for the managed computing system comprises generating new combined inventory data for groups of the combined inventory data that are not identical to corresponding groups of the updated inventory data.

13. The computer-readable storage medium of claim 8, wherein the combined inventory data and the new combined inventory data comprise inventory data for a plurality of components of the managed computing system.

14. The computer-readable storage medium of claim 13, wherein the plurality of components comprise a plurality of: a memory of the managed computing system; memory domains of the managed computing system; processors of the managed computing system; storage resources of the managed computing system; network adapters of the managed computing system; input/output controllers of the managed computing system; graphics controllers of the managed computing system; bus slots of the managed computing system; devices present in bus slots of the managed computing system; and media controllers of the managed computing system.

15. A computing system, comprising:

one or more processors;

a memory storing a firmware executable on the processors;

a baseboard management controller (BMC); and at least one computer-readable storage medium having computer-executable instructions stored thereupon which, when executed by the one or more processors, cause the computing system to:

generate a request for combined inventory data for the computing system, the request generated by the firmware to an identifier exposed by the BMC;

receive the combined inventory data for the computing system at the firmware in response to the request;

perform an inventory of the managed computing system to obtain updated inventory data for the computing system;

determine if the updated inventory data and the combined inventory data are identical;

responsive to determining that the updated inventory data and the combined inventory data are not identical, generate new combined inventory data for the computing system; and post the new combined inventory data for the computing system to the identifier exposed by the BMC.

16. The computing system of claim 15, wherein the at least one computer-readable storage medium has further computer-executable instructions stored thereupon which, when executed by the one or more processors, cause the computing system to pass control from the firmware to an operating system responsive to determining that the updated inventory data and the combined inventory data are identical.

17. The computing system of claim 15, wherein the at least one computer-readable storage medium has further computer-executable instructions stored thereupon which, when executed by the one or more processors, cause the computing system to:

following posting the new combined inventory data for the managed computing system to the identifier exposed by the BMC, instruct the BMC to begin processing of the new combined inventory data; and pass control from the firmware to an operating system.

18. The computing system of claim 15, wherein the combined inventory data is organized into groups, the updated inventory data is organized into groups, and wherein determining if the updated inventory data and the combined inventory data are identical comprises determining if groups of the combined inventory data are identical to corresponding groups of the updated inventory data.

19. The computing system of claim 18, wherein generating new combined inventory data for the managed computing system comprises generating new combined inventory data for groups of the combined inventory data that are not identical to corresponding groups of the updated inventory data.

20. The computing system of claim 15, wherein the combined inventory data and the new combined inventory data comprise inventory data for a plurality of components of the managed computing system, and wherein the plurality of components comprise a plurality of: a memory of the managed computing system; memory domains of the managed computing system; processors of the managed computing system; storage resources of the managed computing system; network adapters of the managed computing system; input/output controllers of the managed computing system; graphics controllers of the managed computing system; bus slots of the managed computing system; devices present in bus slots of the managed computing system; and media controllers of the managed computing system.

* * * * *